United States Patent
Valle, IV et al.

(10) Patent No.: US 11,290,043 B2
(45) Date of Patent: Mar. 29, 2022

(54) HIGH PERFORMANCE CURRENT SENSING ARCHITECTURE FOR BRUSHLESS MOTORS

(71) Applicant: Barrett Technology, LLC, Newton, MA (US)

(72) Inventors: Claude F. Valle, IV, Burlington, MA (US); Amy A. Blank, Brighton, MA (US); Brian Zenowich, Wayland, MA (US); Thomas Nadovich, Newton, MA (US); Donald E. Drumm, Billerica, MA (US); Christopher Woodall, Somerville, MA (US); William T. Townsend, Weston, MA (US)

(73) Assignee: Barrett Technology, LLC, Newton, MA (US)

( * ) Notice: Subject to any disclaimer, the term of this patent is extended or adjusted under 35 U.S.C. 154(b) by 0 days.

(21) Appl. No.: 16/678,554

(22) Filed: Nov. 8, 2019

(65) Prior Publication Data
US 2020/0153372 A1    May 14, 2020

Related U.S. Application Data

(60) Provisional application No. 62/758,004, filed on Nov. 9, 2018, provisional application No. 62/861,772, filed on Jun. 14, 2019.

(51) Int. Cl.
*H02M 7/5387* (2007.01)
*H02P 21/05* (2006.01)
(Continued)

(52) U.S. Cl.
CPC .............. *H02P 21/05* (2013.01); *H02P 21/22* (2016.02); *H02P 27/12* (2013.01)

(58) Field of Classification Search
CPC .......... H02P 21/05; H02P 21/22; H02P 27/12; H02M 7/53873
See application file for complete search history.

(56) References Cited

U.S. PATENT DOCUMENTS 5,541,484 A      7/1996   DiTucci
6,301,137 B1 *  10/2001   Li ..................... H02M 7/53873
                                                            363/98

(Continued)

*Primary Examiner* — Cortez M Cook
(74) *Attorney, Agent, or Firm* — Pandiscio & Pandiscio

(57) ABSTRACT

A motor controller for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the motor controller comprising: a three-phase power supply for supplying the three phase currents $i_A$, $i_B$ and $i_C$ a first sensor for sensing the phase current $i_A$; a second sensor for sensing across the phase currents $i_B$ and $i_C$; and a microcontroller for controlling the operation of the three-phase power supply so as to produce the three phase currents $i_A$, $i_B$ and $i_C$ needed to operate the three-phase permanent magnet synchronous electric motor, wherein the microcontroller reads the outputs of the first sensor and the second sensor and adjusts operation of the three-phase power supply so as to produce phase currents $i_A$, $i_B$ and $i_C$ which produce the desired torque in the three-phase permanent magnet synchronous electric motor.

14 Claims, 20 Drawing Sheets

(51) Int. Cl.
*H02P 27/12* (2006.01)
*H02P 21/22* (2016.01)

(56) References Cited

U.S. PATENT DOCUMENTS

| | | |
|---|---|---|
| 9,257,919 B2 | 2/2016 | Pisau |
| 9,291,666 B2 | 3/2016 | Ueno et al. |
| 2008/0265829 A1* | 10/2008 | Hayashi .................. H02P 21/26 |
| | | 318/781 |

* cited by examiner

Clarke transform:

$$i_\alpha = i_A$$

$$i_\beta = \frac{i_B - i_C}{\sqrt{3}}$$

$$ADC_{OUT} = \left[ \frac{2^{ADC_{bits}-1}}{V_{CC}} \left( R_1 \left( \frac{R_3+R_5}{R_3} \right) \left( \frac{R_4}{R_2+R_4} \right) I_A + V_{CC} \left( \frac{R_3+R_5}{R_3} \right) \left( \frac{R_2}{R_2+R_4} \right) \right) \right]$$

$$ADC_{OUT} = \left\lceil \frac{2^{ADC_{bits}-1}}{V_{CC}} \left( \left(\frac{R_5}{R_3}\right)(I_B R_1 - I_C R_2) + V_{BIAS} \right) \right\rceil$$

HIGH PERFORMANCE CURRENT SENSING ARCHITECTURE FOR BRUSHLESS MOTORS

REFERENCE TO PENDING PRIOR PATENT APPLICATIONS

This patent application:

(i) claims benefit of prior U.S. Provisional Patent Application Ser. No. 62/758,004, filed Nov. 9, 2018 by Barrett Technology, LLC and Claude F. Valle IV et al. for HIGH PERFORMANCE CURRENT SENSING ARCHITECTURE FOR BRUSHLESS MOTORS; and (ii) claims benefit of prior U.S. Provisional Patent Application Ser. No. 62/861,772, filed Jun. 14, 2019 by Barrett Technology, LLC and Claude F. Valle IV et al. for HIGH PERFORMANCE CURRENT SENSING ARCHITECTURE FOR BRUSHLESS MOTORS.

The two (2) above-identified patent applications are hereby incorporated herein by reference.

FIELD OF THE INVENTION

This invention relates to motors in general, and more particularly to permanent magnet synchronous electric motors and motor controllers for operating the same.

BACKGROUND OF THE INVENTION

To appreciate the invention, it is important to understand some core concepts:

(i) the basic construction and operation of a 3-phase permanent magnet synchronous electric motor (PMSM);

(ii) two of the mathematical building blocks involved: Clarke and Park transforms;

(iii) 3-phase half-bridge operation: switching states, current paths, diode circulation; and (iv) how the pulse-width modulation (PWM) pattern moments (energize and decay) relate to the motor model and the sampling windows.

Three-Phase Permanent Magnet Synchronous Electric Motor (PMSM)

As shown in FIG. 1, three-phase permanent magnet synchronous electric motor 5 typically comprises a fixed stator 10 comprising a plurality of poles 15, and a rotatable rotor 20 comprising at least one pair of North and South poles (for clarity of illustration, rotatable rotor 20 is shown in FIG. 1 as having only one pair of North and South poles, however, it should be appreciated that in practice, it is common for rotatable rotor 20 to comprise many pairs of North and South poles). Rotatable rotor 20 is movably disposed within fixed stator 10. When poles 15 of fixed stator 10 are appropriately electrically energized, e.g., by a motor controller 25, rotating magnetic fields can be created within the interior of fixed stator 10 so that the poles of rotatable rotor 20 are sequentially attracted toward, or repelled from, poles 15 of fixed stator 10, whereby to cause rotation of rotatable rotor 20 within fixed stator 10. A drive shaft 30 is attached to rotatable rotor 20 so as to provide output power from three-phase permanent magnet synchronous electric motor 5.

Three-phase permanent magnet synchronous electric motor 5 is characterized by three phases A, B, C, and motor controller 25 drives the three phases A, B, C by supplying three phase currents $i_A$, $i_B$, $i_C$. The three phase currents $i_A$, $i_B$, $i_C$ typically comprise pulses, with the timing of the pulses being coordinated so as to cause rotation of rotatable rotor 20.

Clarke and Park

For a sinusoidally-wound permanent magnet synchronous electric motor (PMSM), each of the three phase current waveforms takes a sinusoidal shape as the motor turns (see FIG. 2). The motor torque is a function of these three phase currents. But it is easier and more efficient to control a constant current value than a set of three sinusoidally-varying current values, so the three sensed winding currents are first converted to a 2-phase sinusoidal $\alpha\beta$ system using the Clarke transform (see FIG. 3), then they are converted to a 2-element dq system that eliminates the dependency on electrical angle $\theta$ using the Park transform (see FIG. 4). The q-axis (quadrature) current $i_q$ is solely responsible for generating a motor torque, so it is useful to have this in a single, easily-controllable variable.

3-Phase Half-Bridge, Switching States, Current Paths

To vary the current in the three motor phases using a single DC bus voltage (Vbus), six identical power metal-oxide semiconductor field-effect transistors (MOSFETs) 35 are used in a three-phase half-bridge amplifier configuration 40 shown in FIG. 5. A microcontroller 42 is used to control operation of MOSFET gates 35. It will be appreciated that microcontroller 42 and three-phase half-bridge amplifier configuration 40, together with appropriate supporting circuitry and logic, form motor controller 25.

Each MOSFET gate 35 is labeled with the phase it controls (A, B, C) and whether it is the high-side (H) or the low-side (L) of the bridge (i.e., AH, AL, BH, BL, CH, CL). Each motor phase is labeled (A, B, C), with N being the neutral point of the wye-wound motor. The high-side MOSFETs determine the state of the amplifier which takes the form S[ABC]. Each low-side MOSFET is commanded to be the opposite state as its related high-side MOSFET. This prevents direct conduction from Vbus to ground, also known as shoot-through.

By switching these three bridges (AH/AL, BH/BL, CH/CL) on and off rapidly using calculated timing patterns known as pulse-width modulation (PWM), the amount of current flowing in each motor phase (A, B, C) can be controlled to achieve the desired torque. For example, the PWM pattern in the table shown below in the section entitled "Description Of The States" consists of a series of 7 states (i.e., S[000], S[100], S[110], S[111], S[110], S[100] and S[000]), 4 of which (i.e., S[000], S[100], S[110] and S[111]) are unique.

See FIGS. 6-9.

Descriptions of the States

| State | A | B | C | Description |
|---|---|---|---|---|
| S1 (i.e., S[000]) | 0 | 0 | 0 | Initial state, no current flows |
| S2 (i.e., S[100]) | 1 | 0 | 0 | Phase A excitation, current flows into A, and out through B & C |
| S3 (i.e., S[110]) | 1 | 1 | 0 | Phase A & B excitation, current flows into A and out through C while the phase B current is reduced to zero over time |

| State | A | B | C | Description |
|---|---|---|---|---|
| S4 (i.e., S[111]) | 1 | 1 | 1 | Freewheeling, motor current decays through upper FETs |
| S5 (i.e., S[110]) | 1 | 1 | 0 | Phase A & B excitation, current flows into A & B, and out through C |
| S6 (i.e., S[100]) | 1 | 0 | 0 | Phase A excitation, current flows into A, and out C while the phase B current is reduced to zero over time |
| S7 (i.e., S[000]) | 0 | 0 | 0 | Freewheeling, motor current decays through lower FETs |

The motor's inductance dramatically affects the flow of current through the amplifier. This is first evident in S3. It is logical to assume that current is flowing into phase B because it is connected to Vbus in this state. But the outflow of current in phase B was already built up during S2, and the flow of current cannot change instantly because it is governed by the equation:

$$\Delta i_{phase} = \frac{\Delta t}{L_{phase}} u_{phase}$$

where:
$\Delta i_{phase}$ is the change in phase current (A)
$\Delta t$ is the change in time (s)
$L_{phase}$ is the phase inductance (H)
$u_{phase}$ is the phase voltage (V)

In addition to inductance, other factors can affect the flow of current through the amplifier and/or affect performance of the three-phase permanent magnet synchronous electric motor, e.g., heat effects causing changes in resistance in the coils, heat effects causing changes in friction within the motor, external loads applied to the motor, etc.

For these reasons, it is important for motor controller 25 to continually sense the flow of current through the three motor stages A, B, C and adjust the three phase currents $i_A$, $i_B$, $i_C$ as appropriate in order to produce the desired torque in the three-phase synchronous electric motor.

The initial state S[000] before current begins to flow may be visualized in the context of the 3-phase amplifier diagram shown in FIG. 5, i.e., the initial state S[000] (before current begins to flow) is shown in FIG. 10.

The flow of current in the rest of the states of this example is visualized in FIGS. 11-16.

Various Sensor Architectures

As noted above, the motor's inductance dramatically affects the flow of current through the amplifier. And, in addition to inductance, other factors can affect the flow of current through the amplifier and/or affect performance of the three-phase permanent magnet synchronous electric motor, e.g., heat effects causing changes in resistance in the coils, heat effects causing changes in friction within the motor, external loads applied to the motor, etc.

As a result, it is important for motor controller 25 to continually sense the flow of current through the three motor stages A, B, C and adjust the three phase currents $i_A$, $i_B$, $i_C$ as appropriate in order to produce the desired torque in the three-phase synchronous electric motor.

Various schemes have been developed for sensing the flow of current through the three motor stages A, B, C. Three of the most common architectures are the so-called "Triple-Sensor" architecture, the so-called "Single-Sensor" architecture and the so-called "Standard Dual-Sensor (B & C)" architecture.

Triple-Sensor

In a triple-sensor design, there is a shunt resistor 45 in the current's path to ground for each of the three phases. The microcontroller samples each of the three amplifier outputs (e.g., via operational amplifiers 50) during the "decay" phase of the PWM pattern to get a full picture of the winding currents. See FIG. 17.

There is additive white Gaussian noise (AWGN) in each sample, but the microcontroller is able to sample two inputs simultaneously, so the common-mode noise cancels when calculating $i_\beta$ due to the $i_B$-$i_C$ Clarke term. But $i_\alpha$ still contains the AWGN, and this is carried through the Park transform to yield a q-axis noise factor of 1 (times the AWGN amplitude).

Then the control system is applied to the d-axis and q-axis currents. Then the d-axis & q-axis efforts are transformed back into the sinusoidal alpha-beta system using the inverse Park transform. Finally, the alpha-beta efforts are sent to a PWM generator that determines the three duty cycles required to implement the control effort. This is a 5-step process after sampling: Clarke, Park, control, inverse Park, then PWM generation.

Each sensor (e.g., operational amplifier 50) requires two calibration steps to determine its offset voltage and amplifier gain. For three sensors, this yields six calibration steps.

Single-Sensor

A single-sensor design minimizes the size and cost of the hardware. See FIG. 18.

However, a single-sensor design is unable to match the performance of multi-sensored systems for a few reasons:

(i) The PWM patterns need to be distorted due to minimum sample times. This introduces excess currents in some windings which need to corrected by applying carefully-constructed compensation patterns in subsequent patterns. The rapid injection/correction of phase currents results in undesirable audible noise.

(ii) Pattern distortion results in winding voltages which do not match the motor's natural back-EMF voltages. This results in uneven torque production throughout each electrical cycle.

(iii) Because of the need to take two sequential current samples, there is no way to eliminate the AWGN from either sample. So the phase reconstruction math results in one phase with 2× the AWGN. After passing this noise through the Clarke and Park transforms, the $i_q$ current ends up with 4× the AWGN. This noise negatively affects the controller's ability to apply a constant torque.

(iv) There is substantial calculation overhead involved in choosing which phases to sample, how to stretch the relevant parts of the PWM pattern to allow for sampling, and how to compensate for those distortions in subsequent PWM patterns.

Standard Dual-Sensor (B & C)

Using two current sensors (e.g., operational amplifiers 50) eliminates many of the problems with single-sensor design. See FIG. 19.

The phase currents can be sampled between each PWM pattern, during the decay phase. No pattern distortion is necessary, so the motor generates no audible noise.

Because there is no PWM distortion, the applied winding voltages can be made to match the motor's natural back-EMF voltages. This results in a consistent torque throughout each electrical cycle.

The microcontroller can take simultaneous samples from the two current sensors. This allows calculation of a clean $i_\beta$ term, but the $i_\alpha$ term contains 2× the AWGN. This noise is carried through to the $i_q$ current, negatively affecting the controller's ability to apply a constant torque.

Note that if $i_A$ and $i_B$ are measured instead, $i_C$ would contain 2×AWGN after reconstruction, and the term $i_\beta$ would therefore contain 3×AWGN after the Clarke transform. Thus it is better to measure $i_B$ and $i_C$.

While it still requires reconstructing the third phase current from the two sampled phases, this design eliminates all the calculation overhead involved in sample selection, PWM pattern stretching, and pattern compensation.

In view of the foregoing, there is a need for a new current-sensing architecture which minimizes noise and computational complexity compared to competing designs.

SUMMARY OF THE INVENTION

In an effort to create a high-performance miniature brushless motor controller, a novel current-sensing architecture was developed that minimizes noise and computational complexity compared to competing designs. A dual-sensor design was pursued, but instead of choosing two of the three motor phases to sample and then reconstructing the third phase current, one sensor's difference amplifier (e.g., a difference operational amplifier) was leveraged to yield a direct measurement of the motor's $i_\beta$ current. This results in a 50% noise reduction at the inputs to the controller and allows a calculation step to be skipped in the control loop. See the summary table below:

SUMMARY TABLE

Comparison of various current sensor architectures

| Sensors | Computational complexity | Q-axis noise factor | Calibrations required | Size | Cost | Torque error | Audible noise |
|---|---|---|---|---|---|---|---|
| Triple | 5 | 1 | 6 | Large | High | Low | Low |
| Single | 8 | 4 | 2 | Small | Low | High | High |
| B + C | 6 | 2 | 4 | Medium | Medium | Med | Low |
| Invention: Alpha + Beta | 4 | 1 | 4 | Medium | Medium | Low | Low |

In one preferred form of the invention, there is provided a motor controller for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the motor controller comprising:

a three-phase power supply for supplying the three phase currents $i_A$, $i_B$ and $i_C$.

a first sensor for sensing the phase current $i_A$;

a second sensor for sensing across the phase currents $i_B$ and $i_C$; and a microcontroller for controlling the operation of the three-phase power supply so as to produce the three phase currents $i_A$, $i_B$ and $i_C$ needed to operate the three-phase permanent magnet synchronous electric motor, wherein the microcontroller reads the outputs of the first sensor and the second sensor and adjusts operation of the three-phase power supply so as to produce phase currents $i_A$, $i_B$ and $i_C$ which produce the desired torque in the three-phase permanent magnet synchronous electric motor.

In another form of the invention, there is provided a method for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the method comprising:

supplying the three phase currents $i_A$, $i_B$ and $i_C$ so as to drive the three-phase permanent magnet synchronous electric motor;

sensing the phase current $i_A$ and sensing across the phase currents $i_B$ and $i_C$; and adjusting phase currents $i_A$, $i_B$ and $i_C$ so as to produce phase currents $i_A$, $i_B$ and $i_C$ which produce the desired torque in the three-phase permanent magnet synchronous electric motor.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE INVENTION

The present invention comprises the provision and use of a novel two-sensor current-sensing architecture which focuses on the Alpha and Beta currents.

Figure 1:
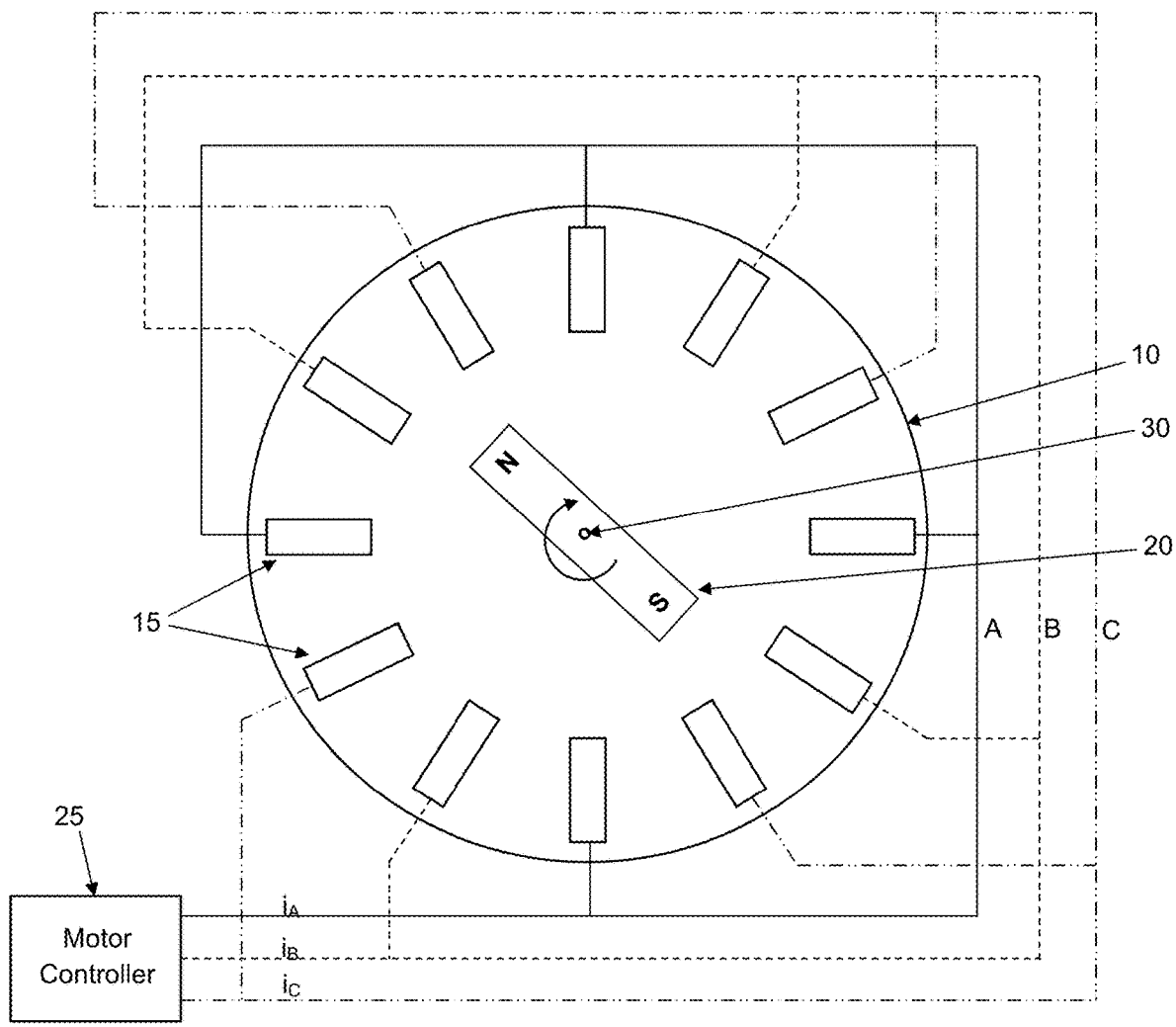
FIG. 1 is a schematic view showing a three-phase permanent magnet synchronous electric motor.
Figure 2:
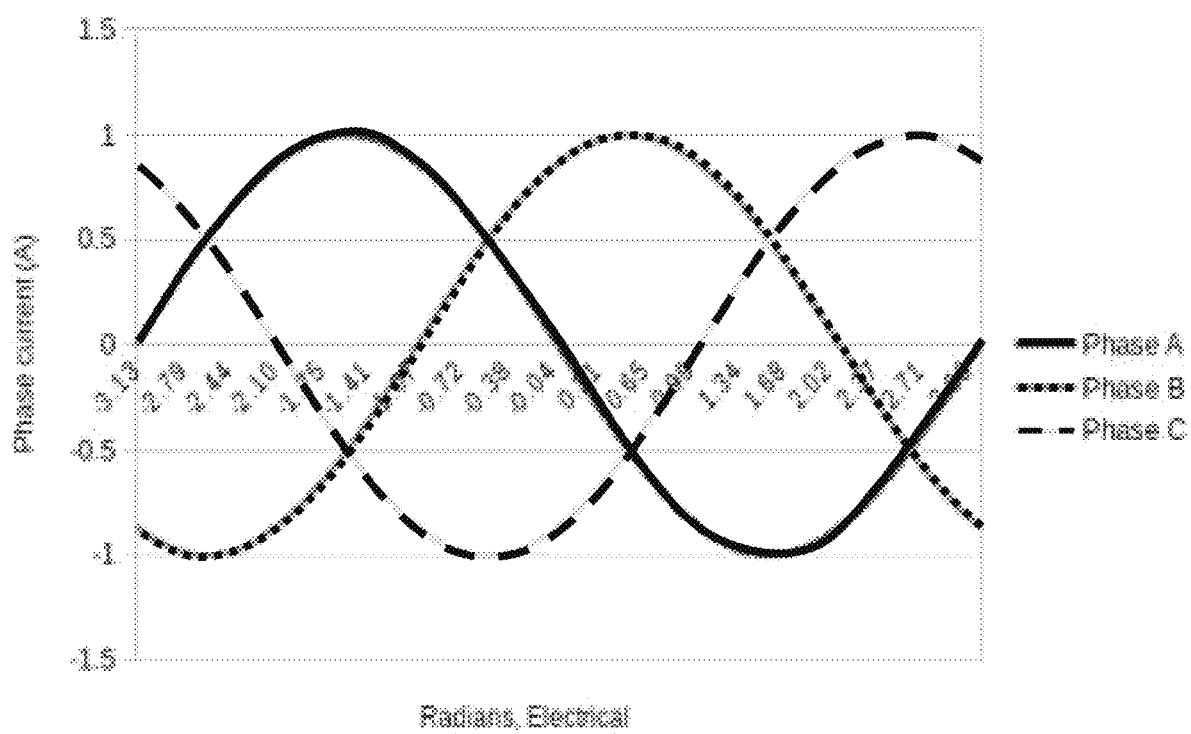
FIG. 2 is a schematic view showing the phase currents for a three-phase permanent magnet synchronous electric motor.
Figure 3:
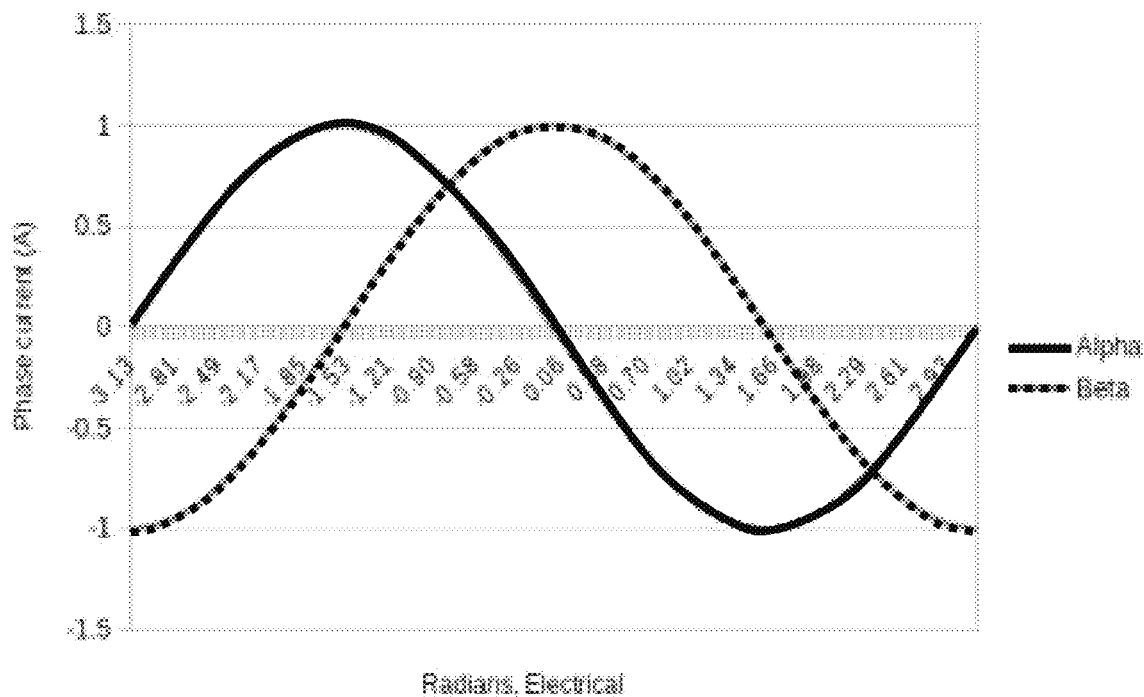
FIG. 3 is a schematic view showing the Clarke transform for the phase currents for a three-phase permanent magnet synchronous electric motor.
Figure 4:
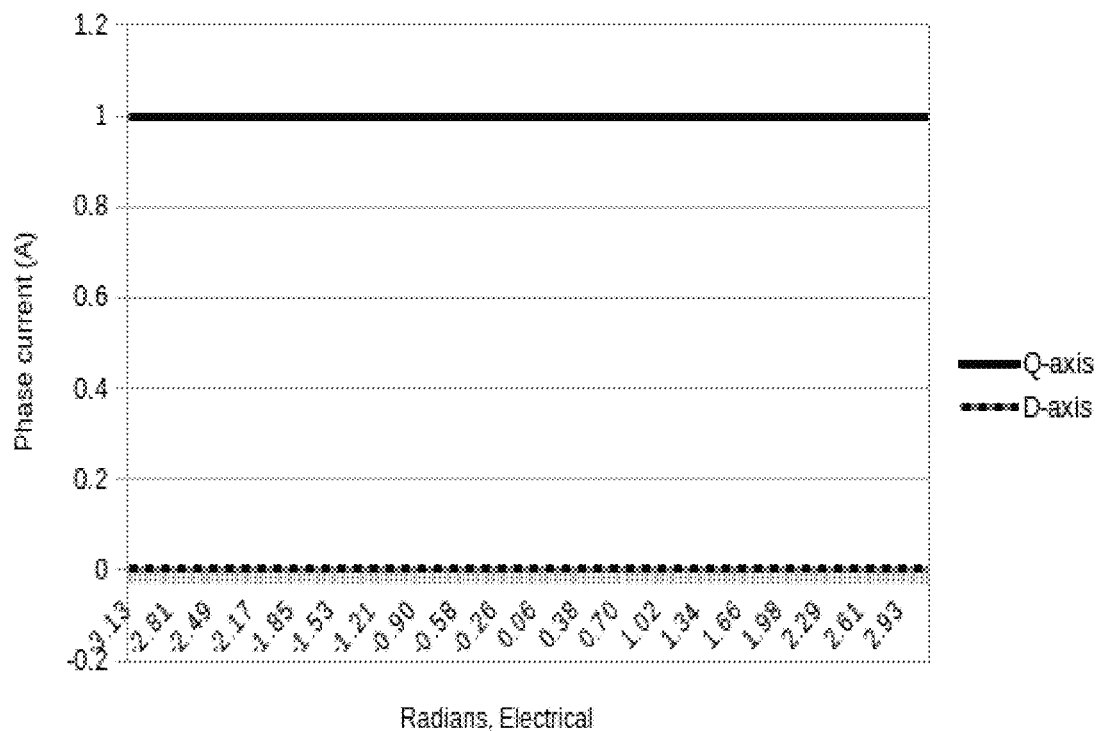
FIG. 4 is a schematic view showing the Park transform for the phase currents for a three-phase permanent magnet synchronous electric motor.
Figure 5:
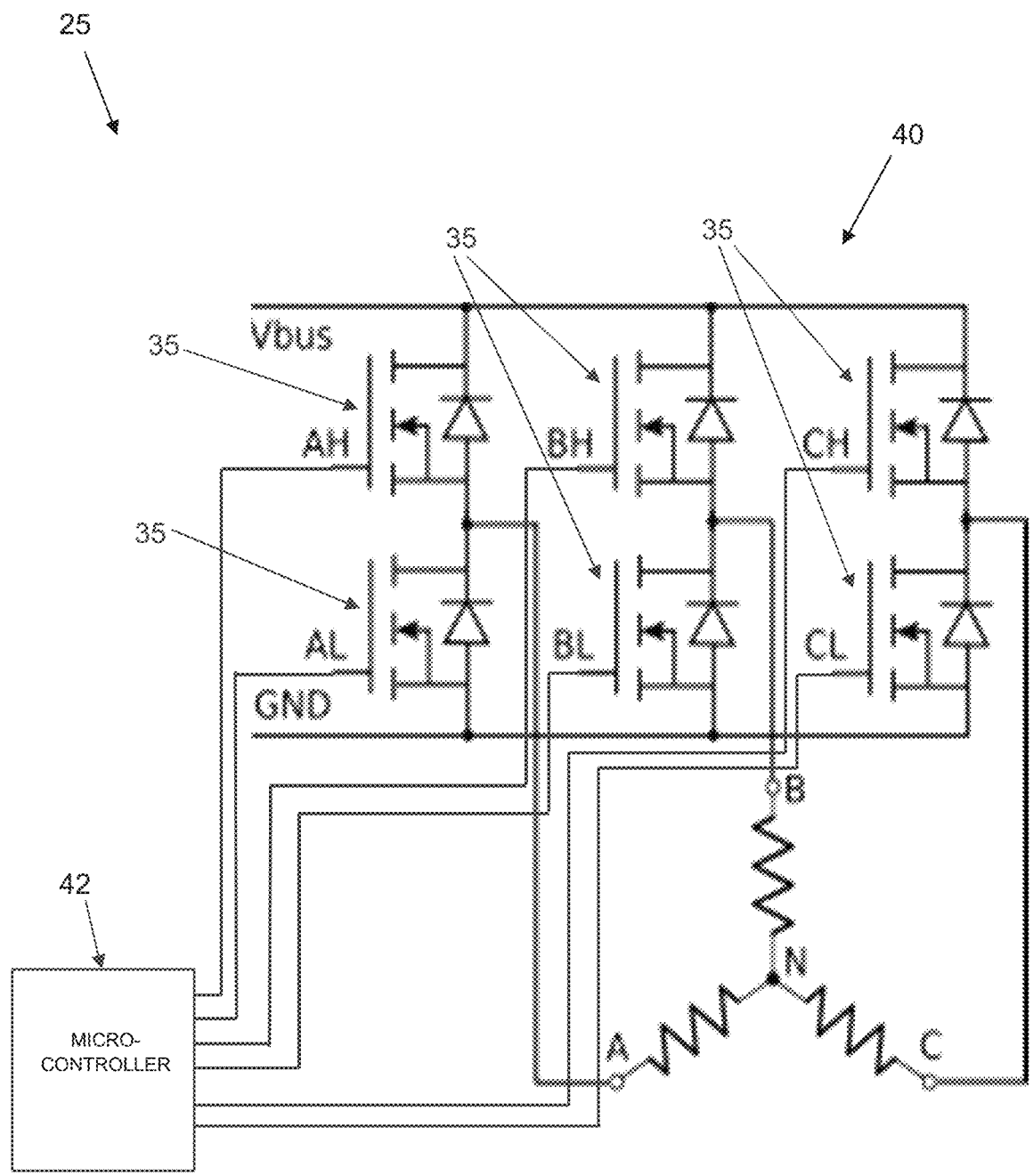
FIG. 5 is a schematic view showing a three-phase half-bridge amplifier which may be used to drive a three-phase permanent magnet synchronous electric motor.
Figure 6:
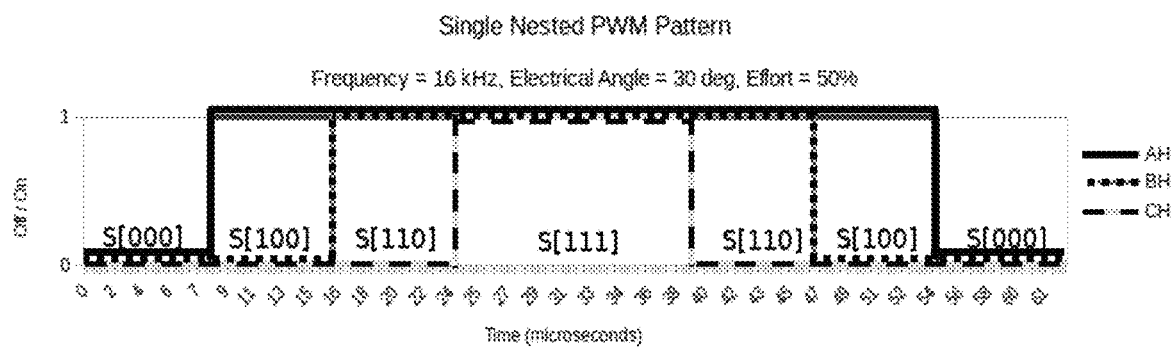
FIGS. 6-9 are schematic views showing a single-nested PWM pattern, phase voltages, phase currents and Alpha-Beta currents for a three-phase permanent magnet synchronous electric motor.
Figure 7:
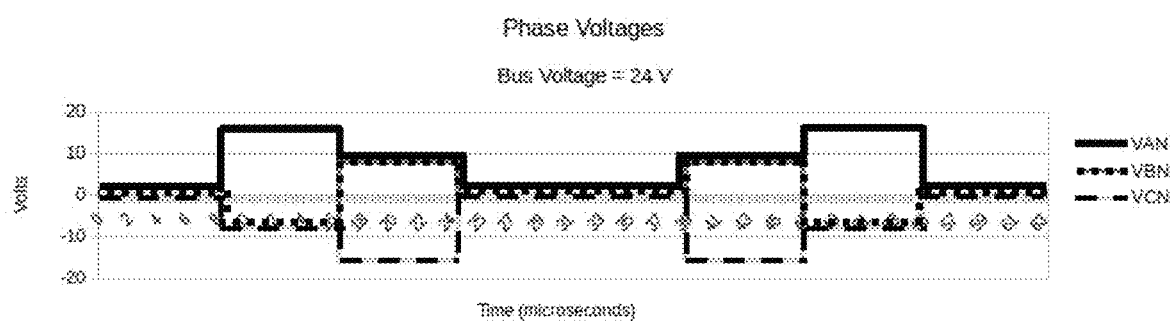
Figure 8:
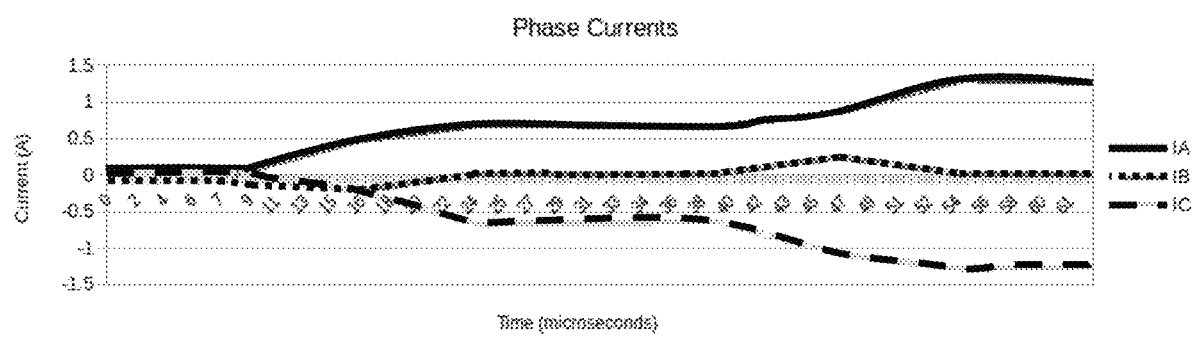
Figure 9:
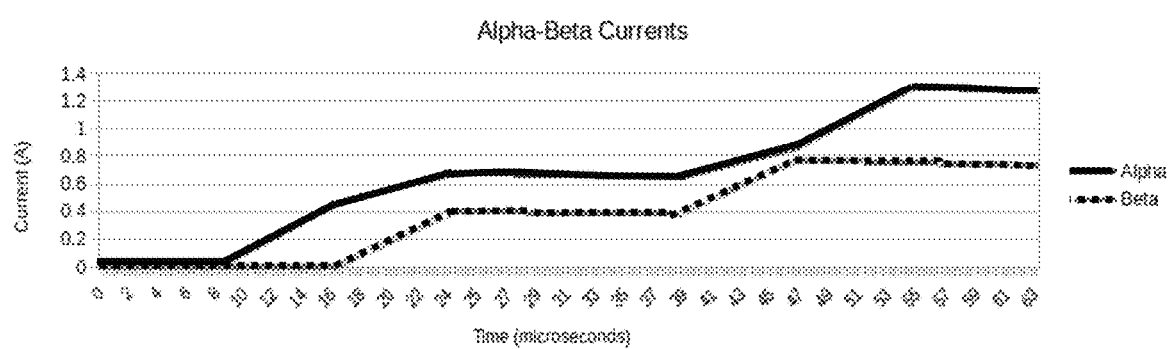
Figure 10:
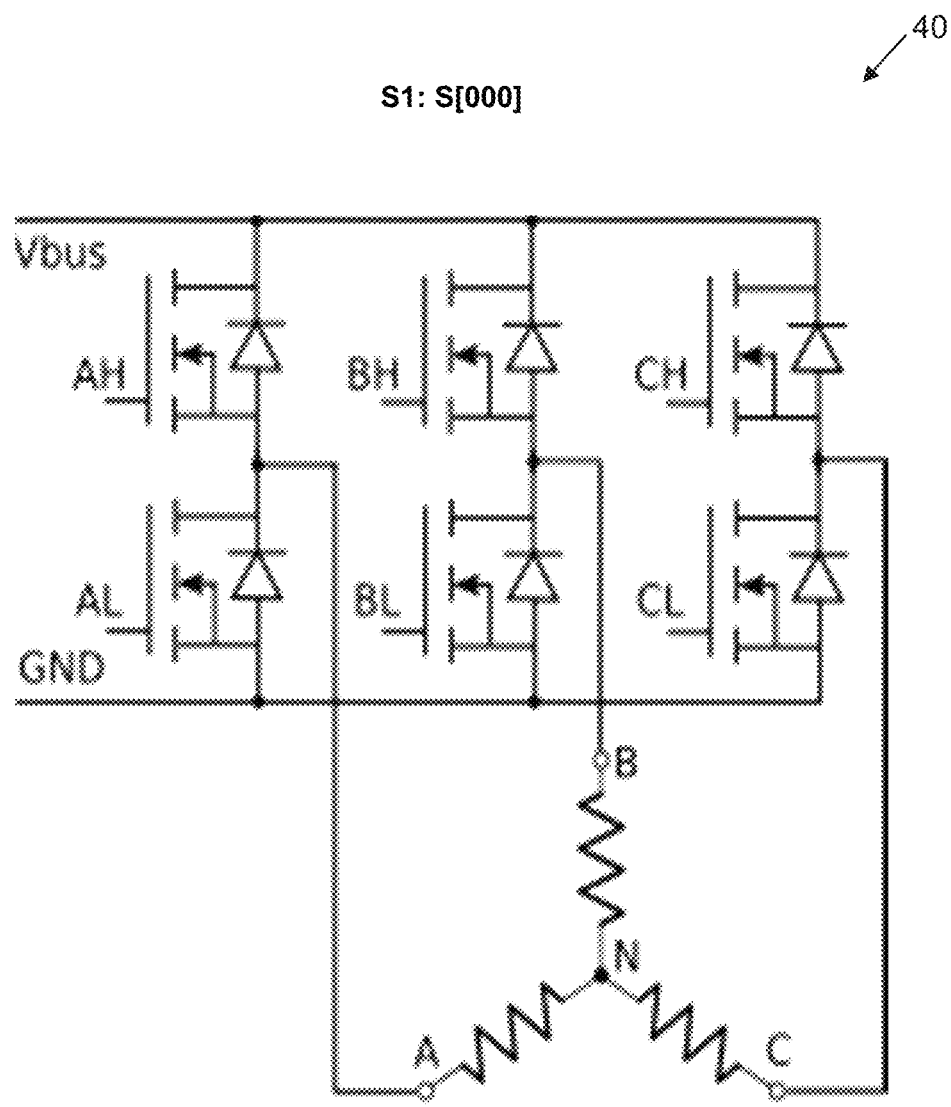
FIGS. 10-16 are schematic views showing the flow of current for various states of a three-phase half-bridge amplifier driving a three-phase permanent magnet synchronous electric motor.
Figure 11:
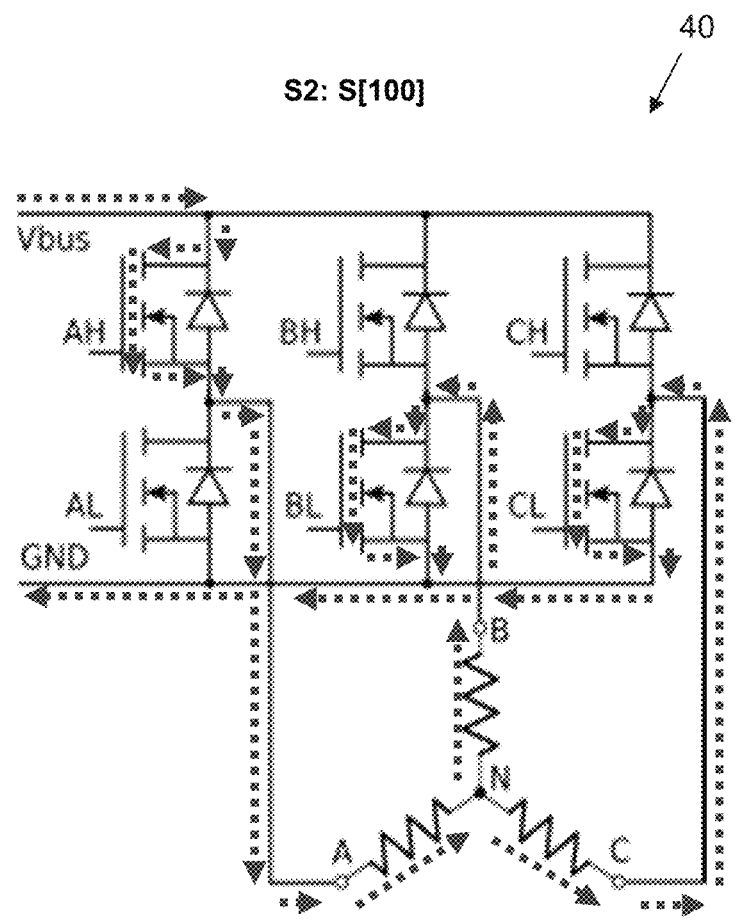
Figure 12:
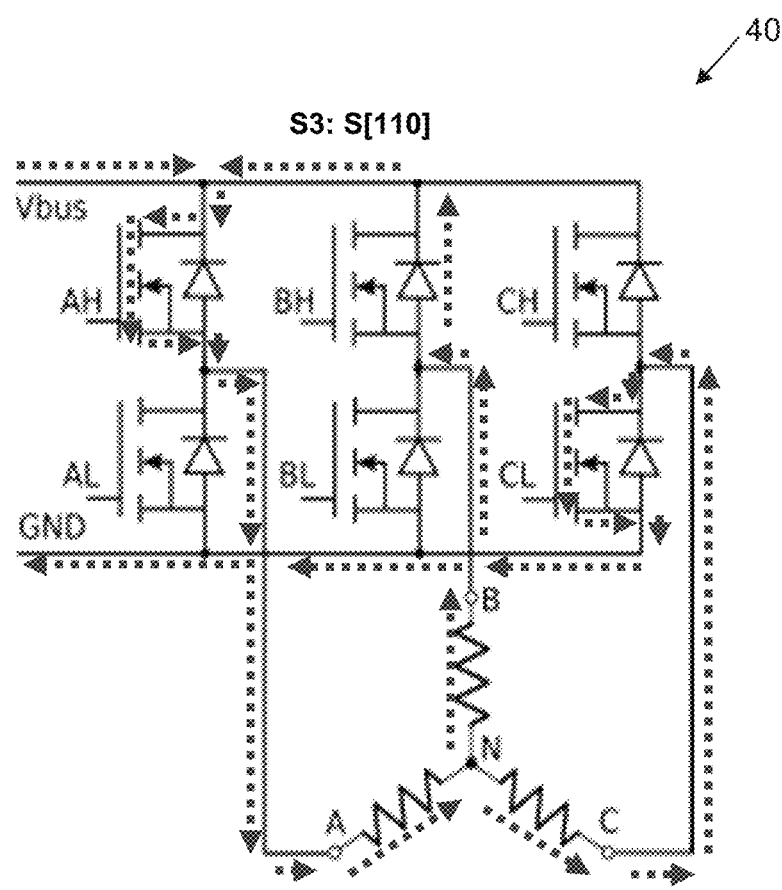
Figure 13:
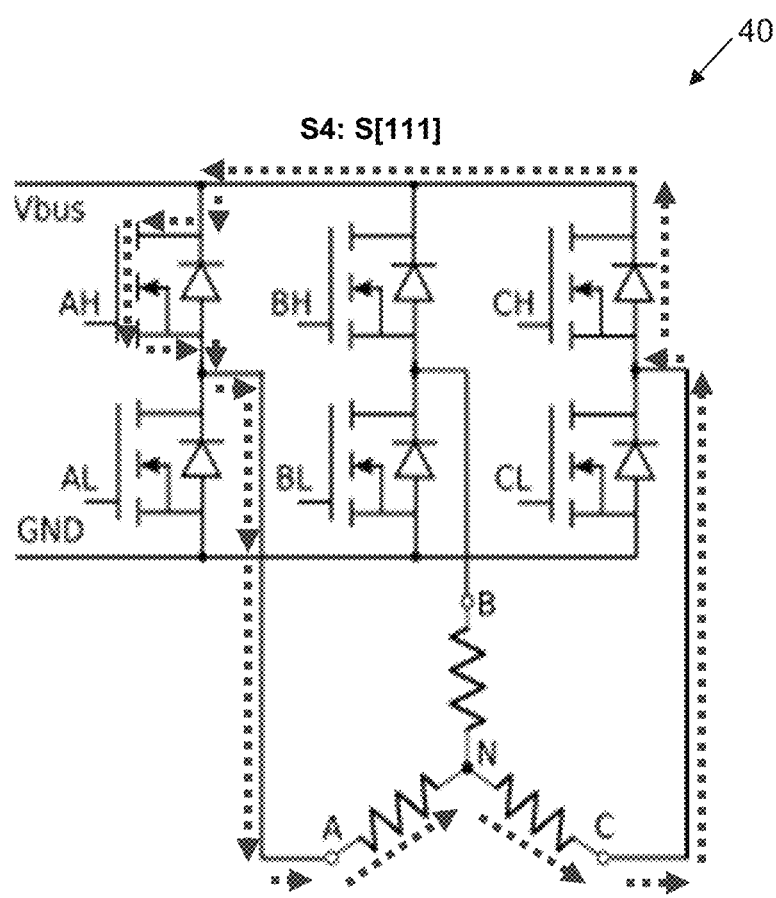
Figure 14:
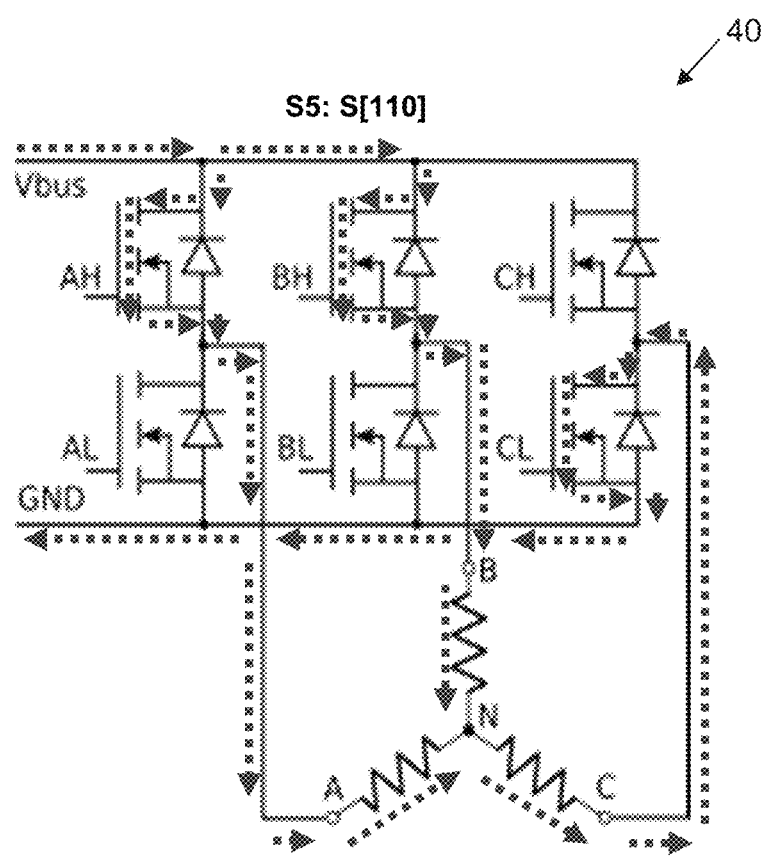
Figure 15:
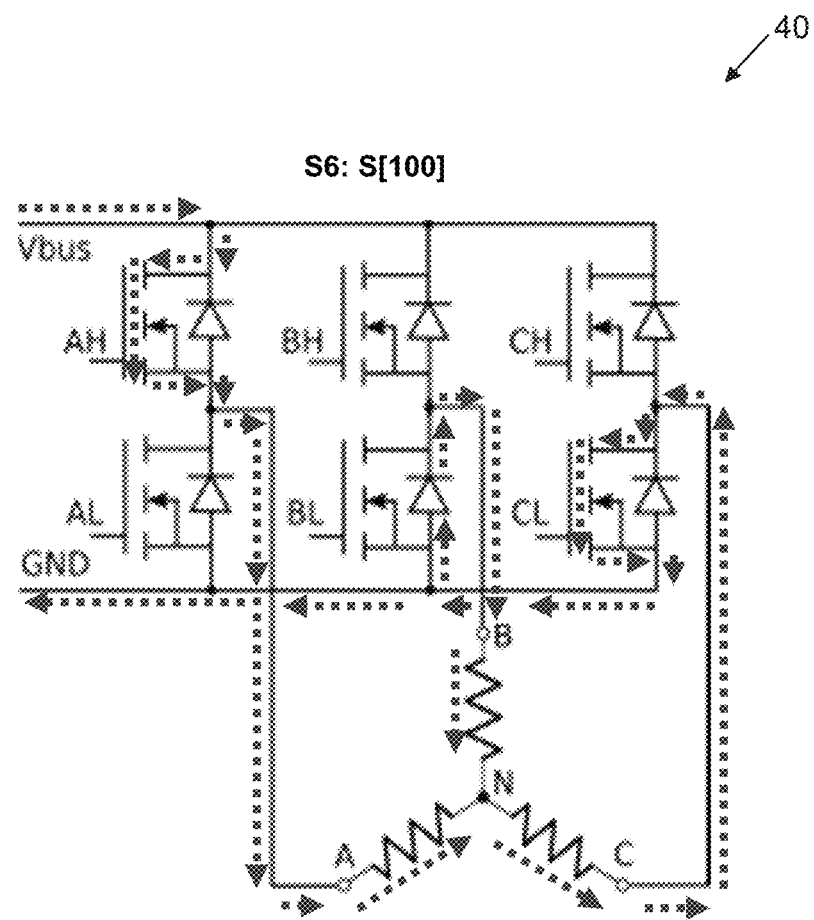
Figure 16:
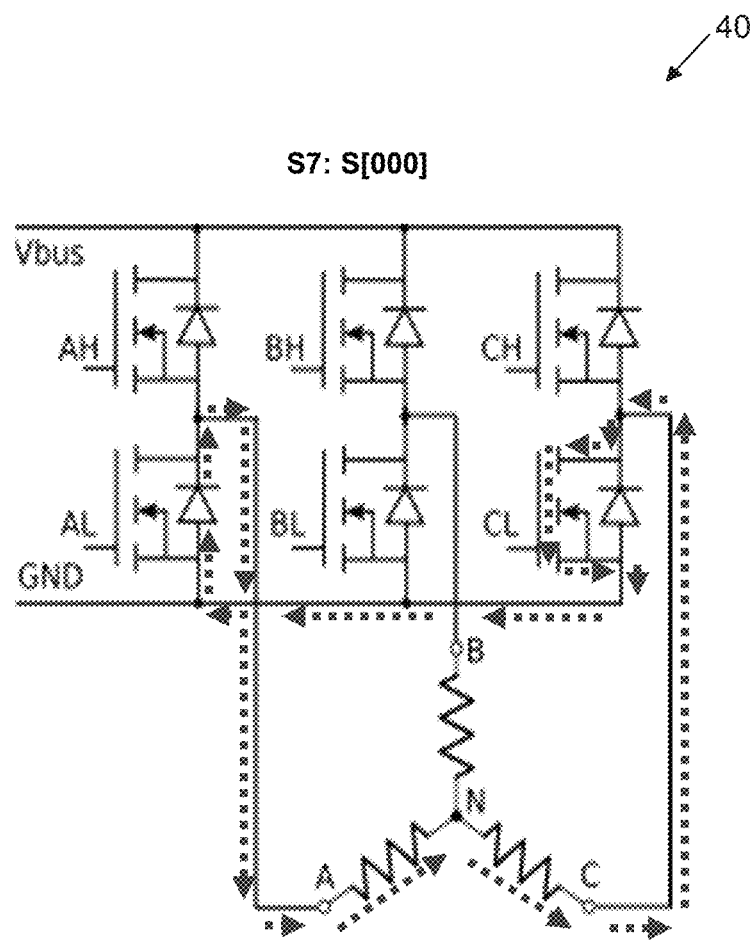
Figure 17:
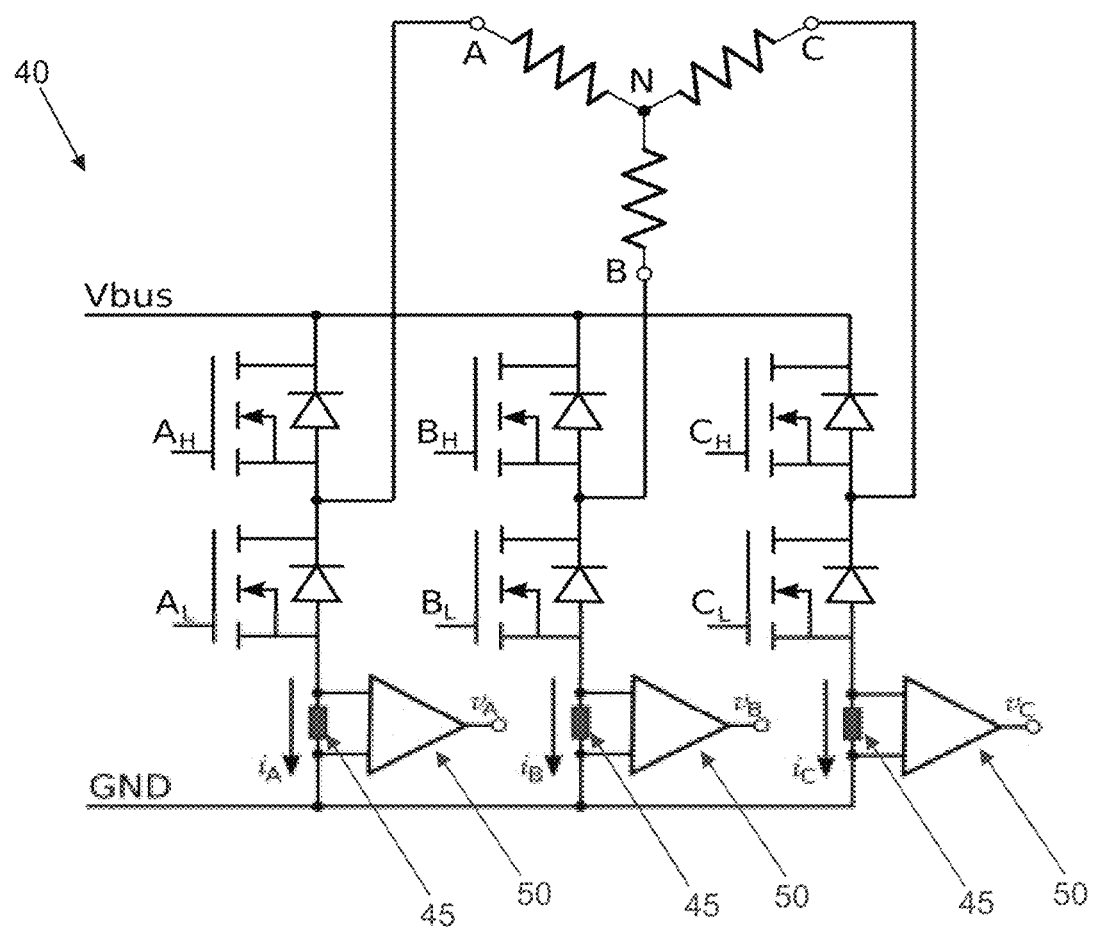
FIG. 17 is a schematic view showing a triple-sensor current-sensing architecture.
Figure 18:
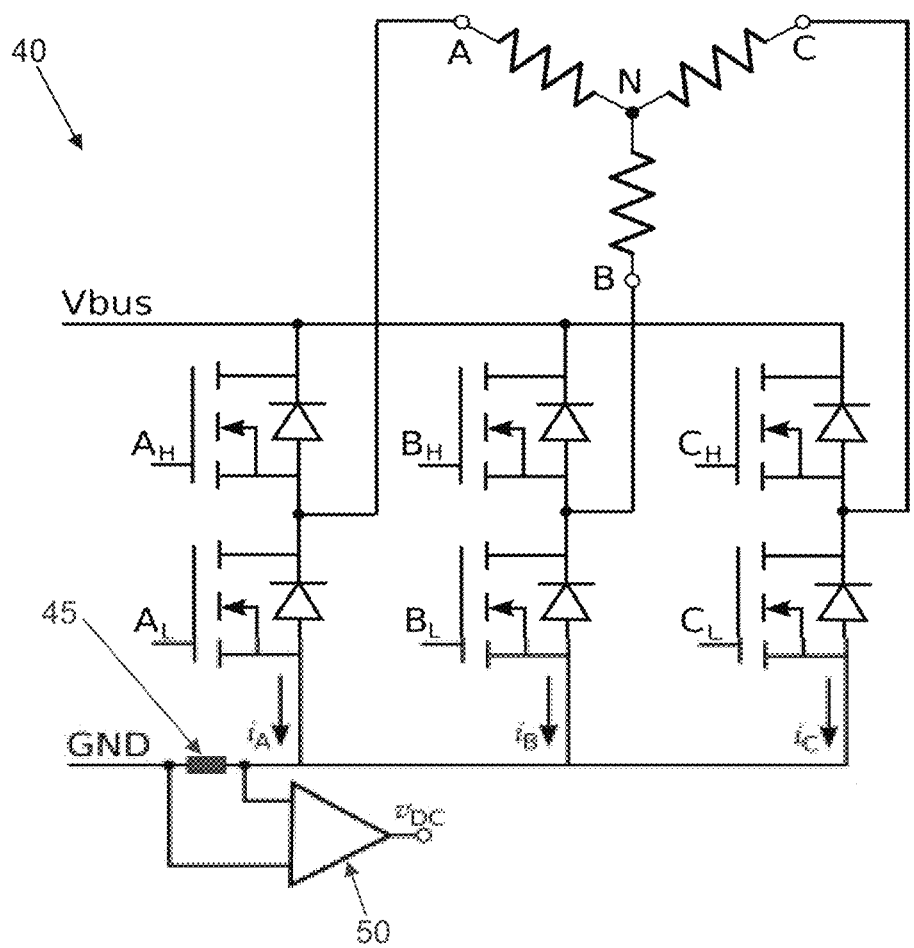
FIG. 18 is a schematic view showing a single-sensor current-sensing architecture.
Figure 19:
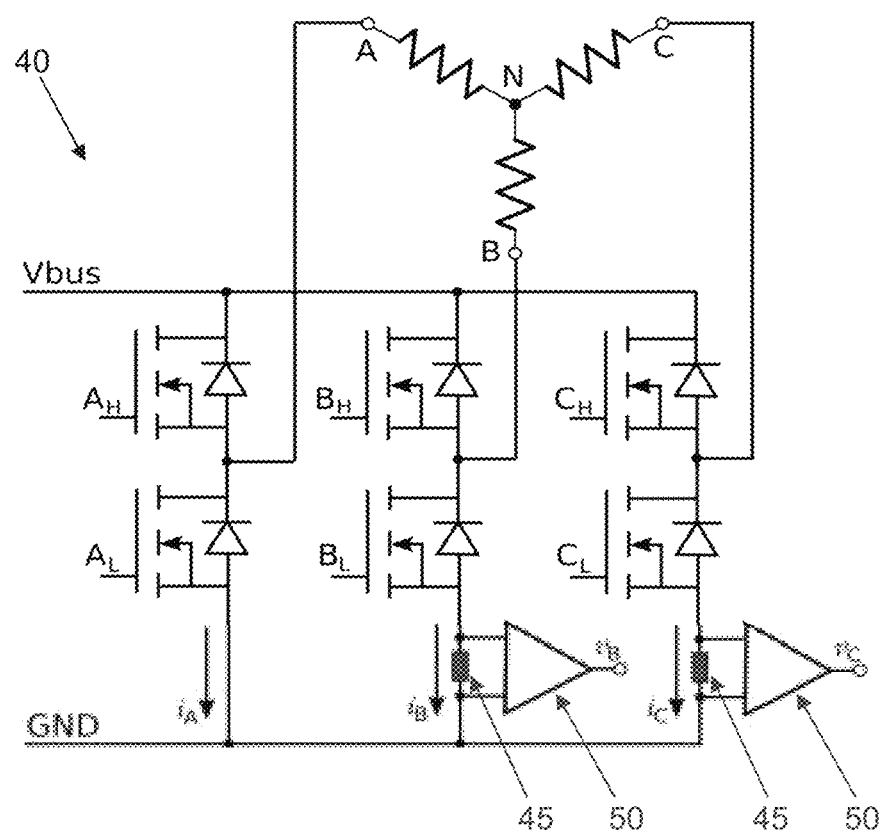
FIG. 19 is a schematic view showing a two-sensor current-sensing architecture.
Figure 20:
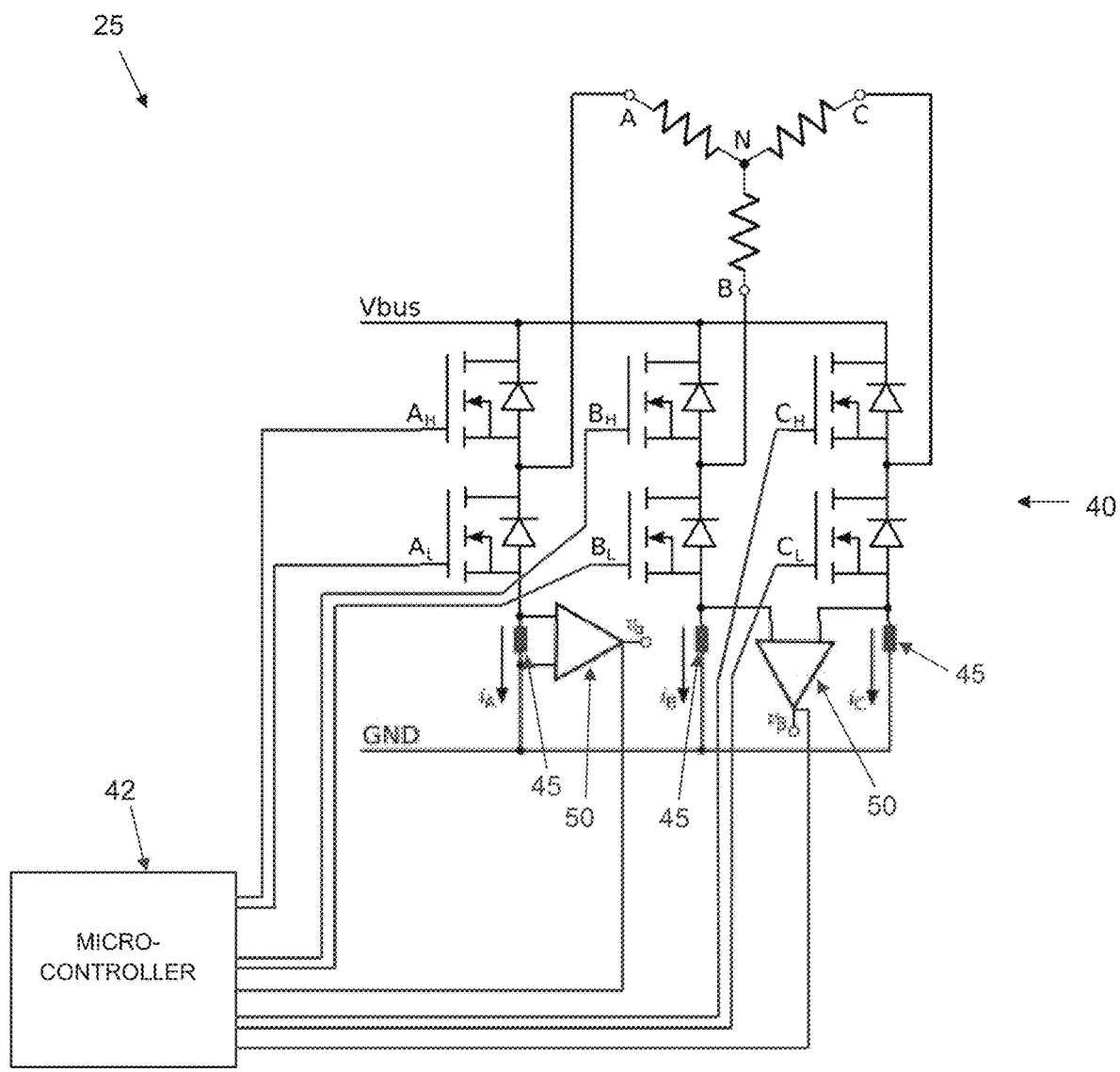
FIG. 20 is a schematic view showing the novel current-sensing architecture of the present invention.

More particularly, as shown in FIG. 20, the novel approach is to put one sensor (e.g., an operational amplifier 50) on $i_A$ to monitor the Alpha current and apply the other sensor (e.g., another operational amplifier 50) across phases B and C to monitor the Beta current. Microcontroller 42 of the motor controller 25 reads the outputs of the sensor on the A phase (i.e., the Alpha current sensor) and the sensor across the B and C phases (i.e., the Beta current sensor) and adjusts the operation of the three-phase half-bridge amplifier (i.e., by appropriately controlling MOSFET gates 35 so as to produce the desired torque in the three-phase permanent magnet synchronous electric motor.

Using this architecture, a clean $i_\beta$ is measured because the operational amplifier 50 sensing across the B and C phases is immune to common-mode noise, but now the $i_\alpha$ term only contains 1× the AWGN. This cuts the $i_q$ noise in half (compared to the standard dual-sensor method) which allows the current controller to be tuned to be much more aggressive. Additionally, the operational amplifier 50 sensing across the B and C phases is configured with a gain equal to $1/\sqrt{3}V$ times the gain of operational amplifier 50 sensing the A phase, this method eliminates the Clarke transform step from the calculations because the post-transform values are read directly from the hardware.

Offset and Gain Calculation for Alpha & Beta Values

Figure 21:
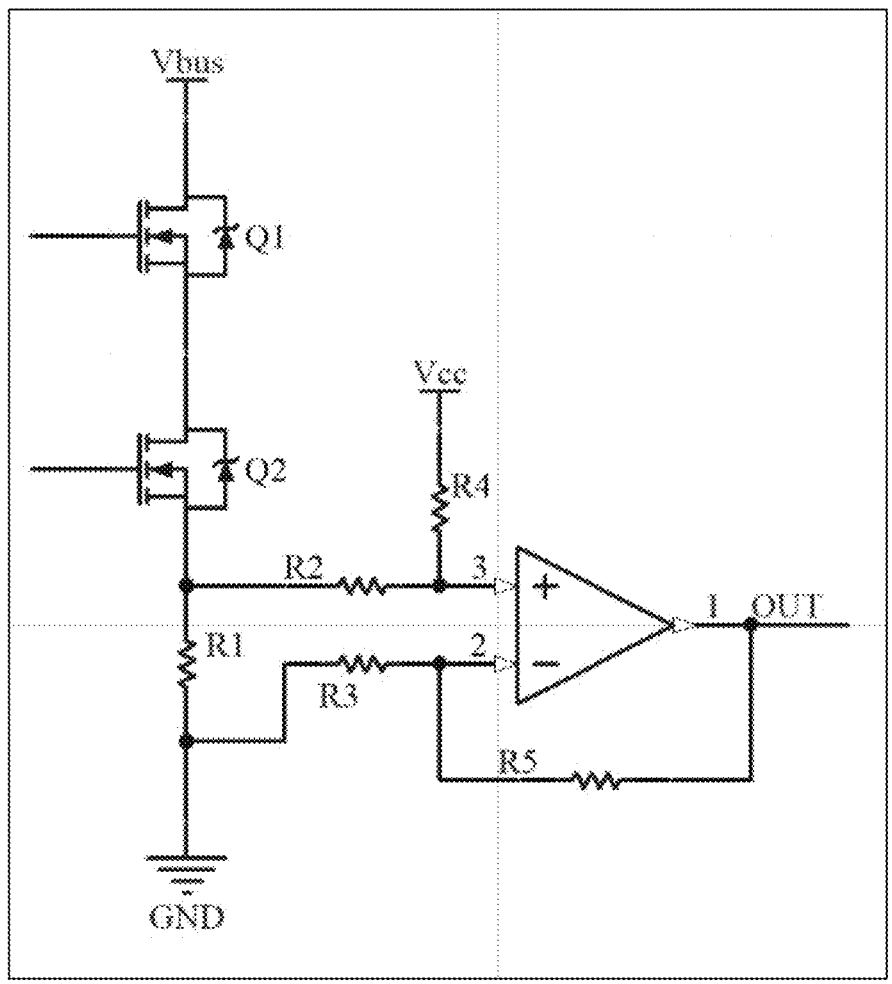
FIG. 21 is a schematic view showing how shunt resistors and operational amplifiers can be selected for some sensor architectures.

For any specific implementation of this design, operational amplifiers 50 must be provided to translate the voltage signal from the shunt resistor 45 to a voltage signal that satisfactorily spans the range of the microcontroller analog-to-digital (ADC) section, effectively setting the range of currents possible to be digitized. For the operational amplifiers 50 in the aforementioned triple sensor, the single sensor and the standard dual sensor designs, this is a simple matter of selecting resistances for the shunt resistors 45 and selecting non-inverting operational amplifiers 50 such that the maximum and minimum desired currents are amplified to the maximum and minimum ADC values, respectively, according to the schematic and formula shown in FIG. 21. This formula shows the ADC reading that will be obtained for a given operational amplifier and shunt current, where $I_{R1}$ is the shunt current, $ADC_{bits}$ is the bit resolution of the ADC, and $V_{CC}$ is the reference voltage for the operational amplifier. From this, acceptable resistance and $V_{CC}$ values can be chosen to provide the correct range for application-specific motor currents and data acquisition systems.

Figure 22:
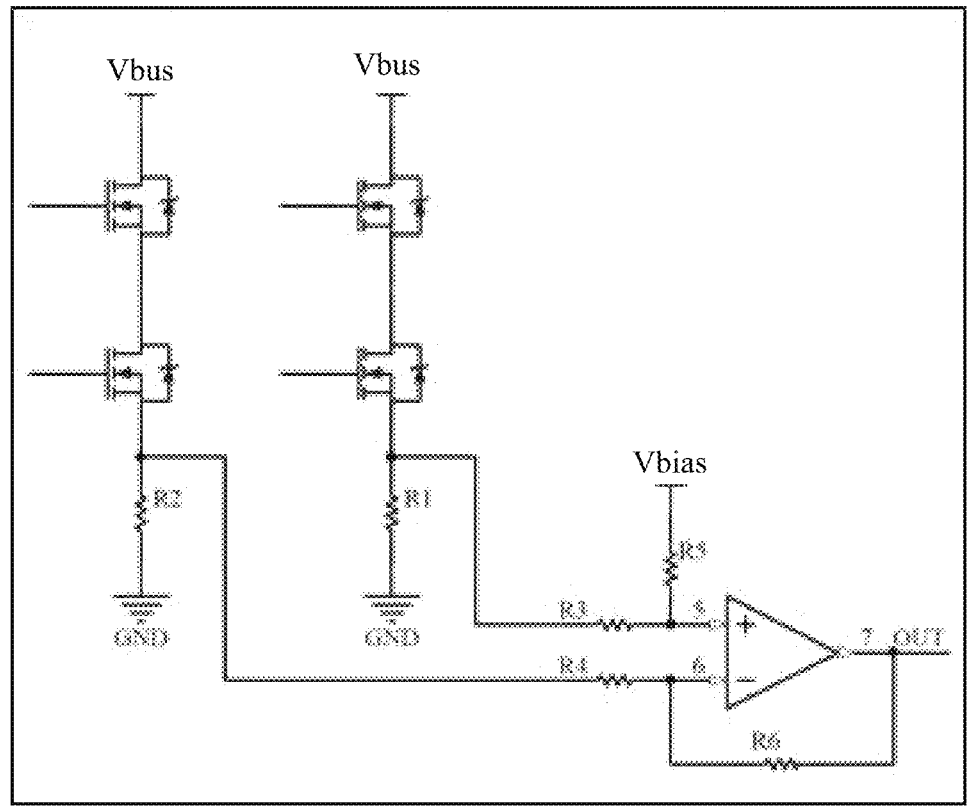
FIG. 22 is a schematic view showing how shunt resistors and operational amplifiers can be selected for other sensor architectures.

This circuit analysis can be applied to the Alpha amplifier (i.e., the operational amplifier 50 used to sense $i_A$) of the new dual-sense design as well. However, this does not hold for the Beta amplifier (i.e., the operational amplifier 50 used to sense across $i_B$ and $i_C$). At a high level, the design of this Beta amplifier is the same: controlling the offset and gain, so the desired output Beta voltage range matches the range of the data acquisition system. However, unlike the single current amplifier, a non-weighted differential amplifier cannot set an arbitrary offset with a resistor divider the way that it is done in the single current design. This is because the input impedance of both amplifier inputs must match to avoid creating difference in gain between the two input signals (R3 must match R4 and R5 must match R6, see FIG. 22). When this is implemented, the output bias voltage is equal to the input bias voltage because two resistor dividers match. The bias voltage is divided by the first, and then multiplied by the second, in a way that they cancel out, and if the first divider ratio is increased so that the bias at 0 is below Vbias (the way it was done in the Alpha amplifier), then the relative gains of B and C no longer match. This means that once the resistor ratio is selected for a given gain, the only remaining way to set the output offset is to change the voltage that is being driven at the top of R5, likely with a dedicated reference voltage. With this addition, the relationship between ADC value and input currents becomes the equation shown in FIG. 22, as long as $R_3$ and $R_4$ are the same value, and so are $R_5$ and $R_6$. In FIG. 22, the current $I_B$ is the current flowing through shunt resistor R2, and $I_C$ is the current through $R_1$.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A motor controller for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the motor controller comprising:
   a three-phase power supply for supplying the three phase currents $i_A$, $i_B$ and $i_C$;
   a first sensor for sensing the phase current $i_A$;
   a second sensor for sensing across the phase currents $i_B$ and $i_C$; and
   a microcontroller for controlling the operation of the three-phase power supply so as to produce the three phase currents $i_A$, $i_B$ and $i_C$ needed to operate the three-phase permanent magnet synchronous electric motor, wherein the microcontroller reads the outputs of the first sensor and the second sensor and adjusts operation of the three-phase power supply so as to produce phase currents $i_A$, $i_B$ and $i_C$ which produce the desired torque in the three-phase permanent magnet synchronous electric motor;

wherein the three-phase power supply comprises a three-phase half-bridge amplifier;
wherein the three-phase half-bridge amplifier comprises:
an A phase section comprising two transistors arranged in series and operated by the microcontroller;
a B phase section comprising two transistors arranged in series and operated by the microcontroller; and
a C phase section comprising two transistors arranged in series and operated by the microcontroller;
wherein the A phase of the three-phase permanent magnet synchronous electric motor is connected between the two transistors of the A phase section of the three-phase half-bridge amplifier; wherein the B phase of the three-phase permanent magnet synchronous electric motor is connected between the two transistors of the B phase section of the three-phase half-bridge amplifier; and wherein the C phase of the three-phase permanent magnet synchronous electric motor is connected between the two transistors of the C phase section of the three-phase half-bridge amplifier;
and further wherein the first sensor is connected to the A phase section of the three-phase half-bridge amplifier, and wherein the second sensor is connected to the B phase section of the three-phase half-bridge amplifier and the C phase section of the three-phase half-bridge amplifier.

2. The motor controller according to claim 1 wherein the first sensor comprises an amplifier.

3. The motor controller according to claim 1 wherein the second sensor comprises an amplifier.

4. The motor controller according to claim 1 wherein the microcontroller causes the three-phase power supply to supply the three phase currents $i_A$, $i_B$ and $i_C$ in the form of pulses.

5. A motor controller for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the motor controller comprising:
a three-phase power supply for supplying the three phase currents $i_A$, $i_B$ and $i_C$;
a first sensor for sensing the phase current $i_A$;
a second sensor for sensing across the phase currents $i_B$ and $i_C$; and
a microcontroller for controlling the operation of the three-phase power supply so as to produce the three phase currents $i_A$, $i_B$ and $i_C$ needed to operate the three-phase permanent magnet synchronous electric motor, wherein the microcontroller reads the outputs of the first sensor and the second sensor and adjusts operation of the three-phase power supply so as to produce phase currents $i_A$, $i_B$ and $i_C$ which produce the desired torque in the three-phase permanent magnet synchronous electric motor;
wherein the three-phase power supply comprises a three-phase half-bridge amplifier;
wherein the three-phase half-bridge amplifier comprises:
an A phase section comprising two transistors arranged in series and operated by the microcontroller, wherein one transistor of the A phase section is a high side transistor and one transistor of the A phase section is a low side transistor;
a B phase section comprising two transistors arranged in series and operated by the microcontroller, wherein one transistor of the B phase section is a high side transistor and one transistor of the B phase section is a low side transistor; and
a C phase section comprising two transistors arranged in series and operated by the microcontroller, wherein one transistor of the C phase section is a high side transistor and one transistor of the C phase section is a low side transistor,
wherein the A phase of the three-phase permanent magnet synchronous electric motor is connected to the A phase section of the three-phase half-bridge amplifier between the high side transistor and the low side transistor of the A phase section of the three-phase half-bridge amplifier; wherein the B phase of the three-phase permanent magnet synchronous electric motor is connected to the B phase section of the three-phase half-bridge amplifier between the high side transistor and the low side transistor of the B phase section of the three-phase half-bridge amplifier; and wherein the C phase of the three-phase permanent magnet synchronous electric motor is connected to the C phase section of the three-phase half-bridge amplifier between the high side transistor and the low side transistor of the C phase section of the three-phase half-bridge amplifier;
and wherein the first sensor is connected to the low side transistor of the A phase section of the three-phase half-bridge amplifier, and wherein the second sensor is connected to the low side transistor of the B phase section of the three-phase half-bridge amplifier and the low side transistor of the C phase section of the three-phase half-bridge amplifier.

6. The motor controller according to claim 5 wherein the first sensor comprises an amplifier.

7. The motor controller according to claim 5 wherein the second sensor comprises an amplifier.

8. The motor controller according to claim 5 wherein the microcontroller causes the three-phase power supply to supply the three phase currents $i_A$, $i_B$ and $i_C$ in the form of pulses.

9. A method for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the method comprising:
supplying the three phase currents $i_A$, $i_B$ and $i_C$ so as to drive the three-phase permanent magnet synchronous electric motor;
sensing the phase current $i_A$ and sensing across the phase currents $i_B$ and $i_C$; and
adjusting phase currents $i_A$, $i_B$ and $i_C$ so as to produce phase currents $i_A$, $i_B$ and $i_C$ which produce the desired torque in the three-phase permanent magnet synchronous electric motor;
wherein a microcontroller causes a three-phase power supply to supply the three phase currents $i_A$, $i_B$ and $i_C$ in the form of pulses;
wherein the three-phase power supply comprises a three-phase half-bridge amplifier;
wherein the three-phase half-bridge amplifier comprises:
an A phase section comprising two transistors arranged in series and operated by the microcontroller;

a B phase section comprising two transistors arranged in series and operated by the microcontroller; and a C phase section comprising two transistors arranged in series and operated by the microcontroller;

wherein the A phase of the three-phase permanent magnet synchronous electric motor is connected between the two transistors of the A phase section of the three-phase half-bridge amplifier; wherein the B phase of the three-phase permanent magnet synchronous electric motor is connected between the two transistors of the B phase section of the three-phase half-bridge amplifier; and wherein the C phase of the three-phase permanent magnet synchronous electric motor is connected between the two transistors of the C phase section of the three-phase half-bridge amplifier;

wherein a first sensor is connected to the A phase section of the three-phase half-bridge amplifier, and wherein a second sensor is connected to the B phase section of the three-phase half-bridge amplifier and the C phase section of the three-phase half-bridge amplifier.

10. The method according to claim 9 wherein a first sensor comprising an amplifier is used to measure the phase current $i_A$.

11. The method according to claim 9 wherein a second sensor comprising an amplifier is used to measure the difference between phase currents $i_B$ and $i_C$.

12. A method for controlling the operation of a three-phase permanent magnet synchronous electric motor, wherein the three-phase permanent magnet synchronous electric motor is characterized by three phases A, B, C, and further wherein the three-phase permanent magnet synchronous electric motor is driven by regulating three phase currents $i_A$, $i_B$ and $i_C$ for the three phases A, B, C, respectively, the method comprising:

supplying the three phase currents $i_A$, $i_B$ and $i_C$ so as to drive the three-phase permanent magnet synchronous electric motor;

sensing the phase current $i_A$ and sensing across the phase currents $i_B$ and $i_C$; and adjusting phase currents $i_A$, $i_B$ and $i_C$ so as to produce phase currents $i_A$, $i_B$ and $i_C$ which produce the desired torque in the three-phase permanent magnet synchronous electric motor;

wherein a microcontroller causes a three-phase power supply to supply the three phase currents $i_A$, $i_B$ and $i_C$ in the form of pulses;

wherein the three-phase power supply comprises a three-phase half-bridge amplifier;

wherein the three-phase half-bridge amplifier comprises an A phase section comprising two transistors arranged in series and operated by the microcontroller, wherein one transistor of the A phase section is a high side transistor and one transistor of the A phase section is a low side transistor; a B phase section comprising two transistors arranged in series and operated by the microcontroller, wherein one transistor of the B phase section is a high side transistor and one transistor of the B phase section is a low side transistor; and a C phase section comprising two transistors arranged in series and operated by the microcontroller, wherein one transistor of the C phase section is a high side transistor and one transistor of the C phase section is a low side transistor, wherein the A phase of the three-phase permanent magnet synchronous electric motor is connected to the A phase section of the three-phase half-bridge amplifier between the high side transistor and the low side transistor of the A phase section of the three-phase half-bridge amplifier; wherein the B phase of the three-phase permanent magnet synchronous electric motor is connected to the B phase section of the three-phase half-bridge amplifier between the high side transistor and the low side transistor of the B phase section of the three-phase half-bridge amplifier; and wherein the C phase of the three-phase permanent magnet synchronous electric motor is connected to the C phase section of the three-phase half-bridge amplifier between the high side transistor and the low side transistor of the C phase section of the three-phase half-bridge amplifier; and wherein a first sensor is connected to the low side transistor of the A phase section of the three-phase half-bridge amplifier, and wherein a second sensor is connected to the low side transistor of the B phase section of the three-phase half-bridge amplifier and the low side transistor of the C phase section of the three-phase half-bridge amplifier.

13. The method according to claim 12 wherein a first sensor comprising an amplifier is used to measure the phase current $i_A$.

14. The method according to claim 12 wherein a second sensor comprising an amplifier is used to measure the difference between phase currents $i_B$ and $i_C$.

* * * * *